United States Patent
Elteto et al.

(10) Patent No.: US 8,495,389 B2
(45) Date of Patent: Jul. 23, 2013

(54) LOCKING CHANGING HARD DISK CONTENT TO A HARDWARE TOKEN

(75) Inventors: Laszlo Elteto, Irvine, CA (US); Michael Cochran, Aliso Viejo, CA (US); Mehdi Sotoodeh, Mission Viejo, CA (US); Tu Le, Irvine, CA (US)

(73) Assignee: SafeNet, Inc., Belcamp, MD (US)

( * ) Notice: Subject to any disclaimer, the term of this patent is extended or adjusted under 35 U.S.C. 154(b) by 1700 days.

(21) Appl. No.: 11/640,485

(22) Filed: Dec. 18, 2006

(65) Prior Publication Data

US 2007/0179896 A1    Aug. 2, 2007

Related U.S. Application Data

(60) Provisional application No. 60/750,808, filed on Dec. 16, 2005.

(51) Int. Cl.
  *G06F 21/00* (2006.01)
(52) U.S. Cl.
  USPC ............... 713/190; 726/7; 726/31; 713/187; 380/255; 709/223; 705/57
(58) Field of Classification Search
  USPC ................................ 713/187, 190; 705/57
  See application file for complete search history.

(56) References Cited

U.S. PATENT DOCUMENTS

| | | | | |
|---|---|---|---|---|
| 4,446,519 A * | 5/1984 | Thomas | ........................ | 711/164 |
| 5,014,234 A * | 5/1991 | Edwards, Jr. | .................. | 726/33 |
| 5,754,646 A * | 5/1998 | Williams et al. | ................ | 705/55 |
| 5,925,127 A * | 7/1999 | Ahmad | ........................... | 726/31 |
| 6,134,659 A * | 10/2000 | Sprong et al. | .................. | 713/190 |
| 7,487,536 B2 * | 2/2009 | Sakurai et al. | ..................... | 726/4 |
| 7,783,880 B2 * | 8/2010 | Pinkerton et al. | ............. | 713/151 |
| 8,055,910 B2 * | 11/2011 | Kocher et al. | ................. | 713/193 |
| 2002/0029347 A1 * | 3/2002 | Edelman | ...................... | 713/193 |
| 2003/0110388 A1 * | 6/2003 | Pavlin et al. | ................... | 713/190 |
| 2003/0120923 A1 * | 6/2003 | Gilman et al. | ................. | 713/170 |
| 2004/0107349 A1 * | 6/2004 | Sasselli et al. | ................ | 713/176 |
| 2004/0127196 A1 * | 7/2004 | Dabbish et al. | .............. | 455/411 |
| 2004/0128515 A1 * | 7/2004 | Rabin et al. | ................... | 713/176 |
| 2004/0177168 A1 * | 9/2004 | Alabraba et al. | ................ | 710/1 |
| 2004/0215755 A1 * | 10/2004 | O'Neill | ......................... | 709/223 |
| 2005/0033697 A1 * | 2/2005 | Mundell et al. | ................. | 705/51 |
| 2007/0033419 A1 * | 2/2007 | Kocher et al. | ................. | 713/193 |

\* cited by examiner

*Primary Examiner* — Morshed Mehedi
(74) *Attorney, Agent, or Firm* — Drinker Biddle & Reath LLP

(57) ABSTRACT

A method for preventing unauthorized use of a software program on a computing device includes updating a state of a software program on a computing device to an updated state. Transmitting an update signal from the software program to a hardware token coupled to the computing device and updating a state of the hardware token to an updated state in response to the received update signal. Performing a first cryptographic check using the updated state of the software program and the updated state of the hardware token with the hardware token. Transmitting the first cryptographic check from the hardware token to the software program and performing a second cryptographic check using the state of the hardware token and the state of the software program with the computing device. Comparing the second cryptographic check to the first cryptographic check with the computing device, and preventing the software program from running on the computing device if the first cryptographic check does not match the second cryptographic check.

18 Claims, 3 Drawing Sheets

LOCKING CHANGING HARD DISK CONTENT TO A HARDWARE TOKEN

FIELD OF THE INVENTION

The invention relates to a system for preventing software piracy, and more particularly to a system using hardware and software to prevent software piracy on a computing device.

BACKGROUND OF THE INVENTION

Software piracy is a large problem for software developers. Software developers use various methods to prevent unauthorized use and distribution of their software products. One known method of protecting a software program involves a hardware device, such as a "dongle," that is attachable to a computer. Prior to execution, the software program communicates with the hardware device to verify that the software program is operating on an authorized platform. In other words, the software program verifies that the hardware device is attached to the computer and authenticates the hardware device prior to executing. If the hardware device is authenticated, the software program is allowed to execute. However, if the hardware device is not attached or is not authenticated, the software program is prevented from executing.

Another known method of protecting a software program from unauthorized use is based on software protections included in the software program. To protect the software program from unauthorized use, the software program stores license data on the computer prior to execution. Software developers may use the license data to distribute the software program in a 'trial' version for use before a user purchases the software program. Trial versions may allow customers to use the software for free or for a nominal fee. Trial versions allow a potential customer to use the software for a limited time (e.g., trial period) after the date of installation or first-use without purchasing the full license. The trial version may allow the user to use only certain parts or may allow the user to use the full capabilities of the software program. When a user installs a trial version of the software, the license data indicates that the software program is operating under a trial license, as opposed to a full license that is received after purchasing the software program. The license data may also indicate an expiration date of the trial license, where after the expiration date, the software program prevents itself from executing and the user must purchase a full license to continue using the software program.

Trial licenses use persistence data. Persistence data is information written onto a hard disk of the computer at various locations. Persistence data contains the installation status of the software (e.g., trial version, full version, etc.) and, for the trial version, the persistence data may also contain the trial period expiration date. The persistence data is used by software developers to prevent users from downloading and/or installing multiple trial versions of the same software program without purchasing the software program. For example, if a trial version of a software program is installed on the computer multiple times, the software program will look for any persistence data stored on the computer before executing to determine whether the later installed software program is permitted to execute. Because persistence data is stored at various locations on the hard disk, it is difficult to find and delete all of the persistence data. Even uninstalling the software program does not remove the persistence data. Thus, persistence data is used by software developers to prevent a user from uninstalling and re-installing the software program. Otherwise, the user would be able to use the software program for another trail period.

However, simple known systems may be used to overcome the protection of the persistence data stored on a hard disk of a computer. If the user makes a backup copy of the hard disk (e.g., with a software program for backing up the hard disk, such as Norton Ghost Utility® or the Microsoft Windows XP® operating system recovery feature) before installation of the software program, and hence before the persistence data of the software program is stored on the hard disk, the backup copy of the hard disk can be restored at a later time (e.g., after the expiration of the trial license) to completely remove the persistence data from the hard disk of the computer. Without the persistence data, the software program does not know whether the user has restored a backup copy of the hard disk of the computer to install the software program for a new trial period. In this situation, a user could reinstall the software program for another trial period without having to purchase the software program. This may be used to circumvent the trial period of the software program, and is particularly detrimental to software developers of high-value software programs.

What is needed is a more secure solution to prevent software piracy, wherein the solution cannot be easily defeated by a simple backup/restore of the hard disk of a computer.

SUMMARY OF THE INVENTION

A method for preventing unauthorized use of a software program on a computing device is provided. The method includes updating a state of a software program on a computing device to an updated state, transmitting an update signal from the software program to a hardware token coupled to the computing device, updating a state of the hardware token to an updated state in response to the received update signal, performing a first cryptographic check using the updated state of the software program and the updated state of the hardware token with the hardware token, transmitting the first cryptographic check from the hardware token to the software program, performing a second cryptographic check using the state of the hardware token and the state of the software program with the computing device, comparing the second cryptographic check to the first cryptographic check with the computing device, and preventing the software program from running on the computing device if the first cryptographic check does not match the second cryptographic check.

A method for preventing unauthorized use of a software program on a computing device is provided. The method includes performing a first cryptographic check based on a state of software program and a state of a hardware token with the hardware token, transmitting the first cryptographic check from the hardware token to the software program, storing the first cryptographic check on the computing device with the software program, performing a second cryptographic check based on a second state of the hardware token and a second state of the software program with the computing device, comparing the first cryptographic check with the second cryptographic check with the computing device, and preventing the software program from running on the computing device if the first cryptographic check does not match the second cryptographic check.

A system for preventing unauthorized use of a software program on a computing device is provided. The system includes a hardware token configured to store a state, receive an update signal and update the state in response to the update signal, perform a first cryptographic check, and transmit the first cryptographic check to a software program on a computing device, a computing device with a computer-readable medium configured to execute a software program wherein the software program is configured to receive a first cryptographic check, have a state, update the state in response to a predetermined event and transmit the update signal to the hardware token, receive a result of a comparison of the first cryptographic check and a second cryptographic check from the computing device, and prevent execution of the software program in response to receiving a result that the comparison that the first cryptographic check does not match the second cryptographic check; receive the state of the hardware token; receive the state of the software program; receive the first cryptographic check; compute a second cryptographic check based on the state of the software program and the state of the hardware token; perform a comparison of the first cryptographic check to the second cryptographic check; and transmit the result of the comparison to the software program.

Further features of the invention, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of the embodiments of the invention, as illustrated in the accompanying drawings. The left most digits in the corresponding reference number indicate the drawing in which an element first appears. Embodiments of the invention are explained in greater detail by way of the drawings, where the same reference numerals refer to the same features.

DETAILED DESCRIPTION OF THE PREFERRED EMBODIMENTS

Embodiments of the invention are discussed in detail below. In describing embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without parting from the spirit and scope of the invention.

The following disclosure relates to a hardware token that communicates with a software program on a computing device to prevent software piracy. Since it is not possible or feasible to prevent users from performing a hardware disk backup/restore operation on their computing device, a state of a hardware token may be linked with a state of persistence data of a software program stored on the computing device.

Figure 1:
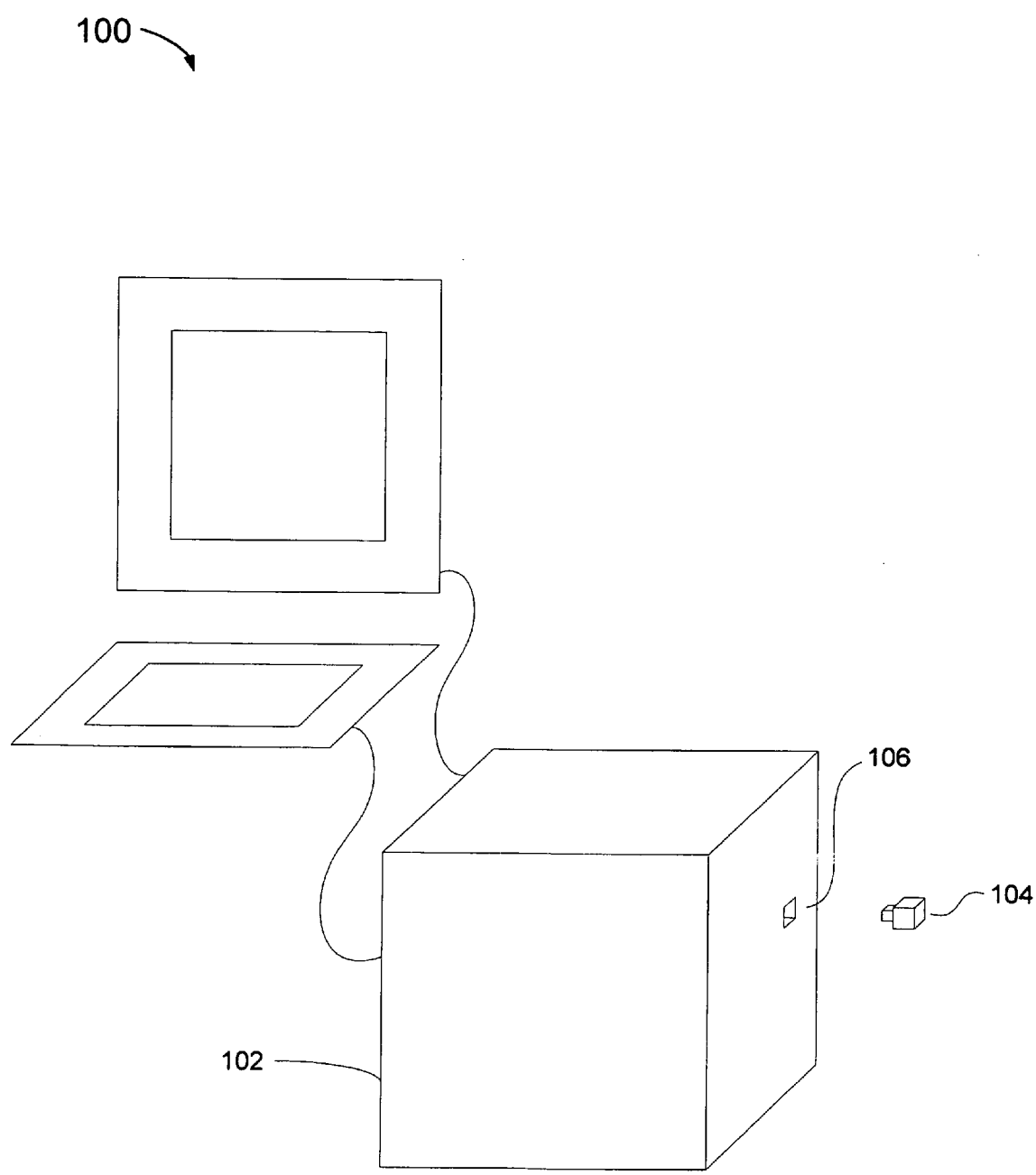
FIG. 1 illustrates an exemplary embodiment of a system for preventing software piracy, according to the present invention.

FIG. 1 illustrates an exemplary embodiment of a system 100 for preventing software piracy according to the present invention. The system 100 includes a computing device 102 and a hardware token 104 that is coupleable with the computing device 102. The computing device 102 can be any device that is suitable for storing and executing a software program. For example, the computing device 102 may be a personal computer, a laptop computer, a personal digital assistant (PDA), a mobile device, or any other known computing device. The hardware token 104 can be inserted at a port 106 of the computing device 102, or the hardware token 104 may be disposed internally within an external casing of the computing device 102. In an alternative embodiment, the computing device 102 and the hardware token 104 may communicate wirelessly. Additionally, instead of a hardware token 104, the software program may be linked to any secure storage device, such as, but not limited to, a Trusted Platform Module (TPM) chip within the computing device 102, a secure Basic Input/Output system (BIOS) storage area, or a secure remote server. These devices may perform the functions of the hardware token 104.

The computing device 102 initially does not have any stored persistence data associated with a software program prior to installing the software program. In one embodiment, persistence data may be any data associated with a software license of the software program. The software license indicates the type of rights a user has in operating the software pro gram, such as, but not limited to, limited or trial rights to only a portion of the software pro gram, or full rights granting access to the entire software program. Persistence data may be a separate data file, a record in a database, a Windows Registry value, and/or may even be represented just by a name of a directory or a file, or any other form of data written onto a storage medium or hard disk of the computing device 102, as will be appreciated by those skilled in the art. The persistence data may indicate the version of the software license (such as a trial version or a full version), an expiration date, a revoked license, a recording of a clock tampering event (e.g., where a date of the computing device 102 is changed to a date occurring in the future or in the past), data from a counter or timer, etc.

Either prior to or during installation of the software program on the computing device 102, a hardware token 104 is connected with the computing device 102. The hardware token 104 is a device adapted to receive a communication from the software program, and in response, to transmit a communication to the software program. The hardware token 104 may store an algorithm for processing the communication received from the software program and for transmitting a communication to the software program. The algorithm may be hardwired on the hardware token 104, or may be reprogrammable, or a combination thereof. The hardware token 104 also includes a programmable memory.

In one embodiment, the hardware token 104 includes software or hardware for determining a number of states S. The state S of the hardware token 104 represents data on the hardware token 104, and changes of the state S represent changes of data stored on the hardware token 104. The states S have an update number i associated with each state S, where i=0, 1, . . . n. For update number i, the state of the hardware token 104 is $S_i$. The states $S_i$ may be numbers, vectors, matrices, a string of numbers, keys to encrypted codes, and/or other data, or other similar information, as will be appreciated by those skilled in the art. The update number i corresponds to the number of updates state S has undergone. The algorithm and states S of the hardware token 104 are completely stored on the hardware token 104, and are not known by and cannot be derived by the software program through communicating with the hardware token 104. The update number i is internal to the hardware token 104 and may only be requested to change or update (in one embodiment it may always be increasing, in another embodiment it may always be decreasing), but the update number i may not be set or reset to a particular value. Since the state S is associated with this always-changing update number i, the user of the computing device 102 cannot save or restore the update number i to a desired update number.

According to an embodiment, the states S of the hardware token 104 are associated with states P of the persistence data of the software program stored on the hard disk of the computing device 102. An update number k is associated with the states P of the persistence data, where k=0, 1, . . . m. The update number k corresponds to the number of updates that state $P_k$ of the persistence data has undergone. The states $P_k$ may be numbers, vectors, matrices, a string of numbers, keys to encrypted codes, and/or other data.

To prevent unauthorized use of the software program according to an exemplary embodiment of the present invention, the states $S_i$ of the hardware token 104 are associated with the states $P_k$ of the persistence data of the software program stored on the computing device 102 to link the update number i and state $S_i$ of the hardware token 104 with the update number k and the state $P_k$ of the persistence data. Each time the persistence data is updated, the state $P_k$ and the update number k are updated. The persistence data of the software program may be updated at regular or irregular time periods, whenever the software program is accessed, or at other known intervals, as will be appreciated by those of skill in the art. After state $P_k$ is updated, the software program transmits an update signal and the state $P_k$ to the hardware token 104 to update the state $S_i$ of the hardware token 104. Since the states $S_i$ of the hardware token 104 are not stored on the software program, a function using state $P_k$ stored at the software program and state $S_i$ stored at the hardware token 104 as inputs may be generated at the hardware token 104 to prevent a user from backing up and restoring an earlier state of the software program.

In one embodiment, whenever the software program updates the state $P_k$ of the persistence data, the hardware token 104 performs a corresponding update of the state $S_i$. Initially, before the software program is installed, the initial state of the hardware token 104 is set to $S_0$. When the software program is installed, the state of the persistence data of the software program is $P_0$. Alternatively, state P may be initialized to any update number when the hardware token 104 is attached to the computing device 102. State $S_0$ of the hardware token 104 may be installed by the manufacturer or may be any previous state stored in the hardware token 104 when the hardware token 104 is attached to the computing device 102. After the software program is installed and persistence data is created on the computing device 102, the software program changes the state P of the persistence data from $P_0$ to $P_1$ and writes the state $P_1$ to the hard disk of the computing device 102. The software program transmits state $P_1$ to the hardware token 104 along with an update signal, and the hardware token 104 updates state S from $S_0$ to $S_1$. Thus, each time the persistence data and the persistence state $P_k$ are updated, the hardware token 104 state $S_i$ is also updated.

For the $i^{th}$ update of state S and the $k^{th}$ update of state P, the state $S_i$ may be associated with the state $P_k$ to prevent unauthorized use of the software program. Update numbers i and k may be the same or different numbers or may have a relationship therebetween. The association between states S and P may be accomplished by using state $S_i$ and state $P_k$ as inputs to a function or an algorithm, or other known computations, as will be appreciated by one skilled in the art. In one embodiment, the hardware token 104 uses state $S_i$ and state $P_k$ as inputs to a function or an algorithm as a cryptographic check.

The cryptographic check may be used by the software program to determine whether the software program is allowed to execute. The cryptographic check may be generated using a function F having both state $P_i$ and state $S_i$ as inputs to determine a cryptographic value $F_{i,k}$, such as $F_{i,k}$=function($S_i$, $P_k$). In one embodiment, the function $F_{i,k}$ is a hash function that hashes state $S_i$ with state $P_k$. As an example, let the state $S_i$ of the hardware token 104 be the value of the update number (value i) expressed in decimal string form and let the persistence data on the computing device 102 be the software's trial expiration date in the form of yyyymmdd. If the current state $S_{10}$=10, the persistence state is $P_2$=20061231 (e.g. $P_1$ was the installed state, and $P_2$ is the state after the first update which occurs during the first use of the software program), and the function F is the SHA-1 algorithm, then the values of $S_{10}$ and $P_2$ are concatenated together to form a string "1020061231" as an input to the function $F_{2,10}$=SHA1 ("1020061231") and generates the cryptographic value. Other known functions or algorithms may be used, and the input states may or may not be concatenated in the function, as will be appreciated by those of skill in the art.

Once the hardware token 104 calculates the cryptographic value $F_{i,k}$, the hardware token 104 communicates the cryptographic value $F_{i,k}$ to the software program on the computing device 102. The software program stores the cryptographic value $F_{i,k}$ as the cryptographic check with $P_k$ for comparison with a later computed version of the cryptographic value F and state P to verify that the persistence data stored on the hard disk of computing device 102 has not been updated without a similar update of the state S of the hardware token 104. As long as a backup copy of the hard disk has not been restored on the computing device 102, then the update number k of the state $P_k$ of the persistence data corresponds with the update number i of the state $S_i$. This also implies that a later generated cryptographic check of the cryptographic value F with state P will correspond with the earlier generated cryptographic check of the cryptographic value F with state P, as will be described later in detail regarding the verification process.

Figure 2:
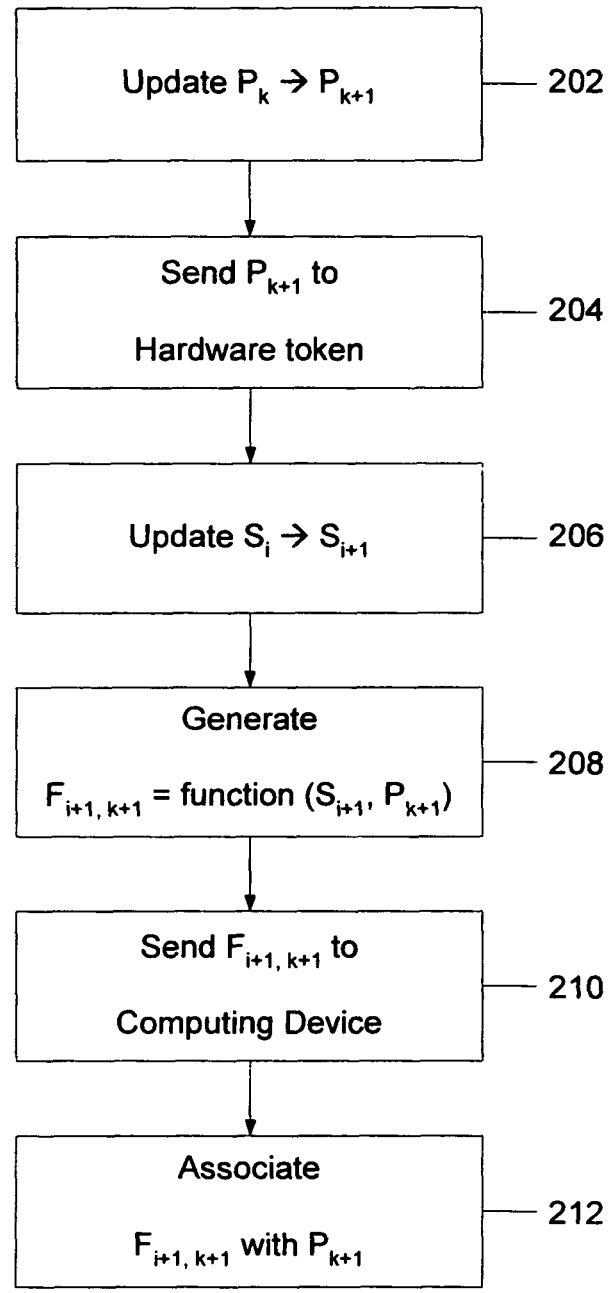
FIG. 2 illustrates an exemplary flow diagram for a method of updating state P, state S, and function F, according to the present invention.

FIG. 2 illustrates an exemplary flow diagram of a method for updating the states P, S, and function F. In 202, the persistence data is changed on the hard disk of the computing device 102, which triggers an update of state $P_k$ to state $P_{k+1}$. In 204, the software program transmits $P_{k+1}$ to the hardware token 104 along with an update signal instructing the hardware token 104 to update state S. In 206, the hardware token 104 updates state $S_i$ to state $S_{i+1}$. In 208, the hardware token 104 generates $F_{i+1,k+1}$=function($S_{i+1}$, $P_{k+1}$). In 210, the hardware token 104 transmits the cryptographic value $F_{i+1,k+1}$ to the computing device 102. In 212, the software program stores the cryptographic value $F_{i+1,k+1}$ on the hard disk of the computing device 102 as a cryptographic check with state $P_{k+1}$.

Figure 3:
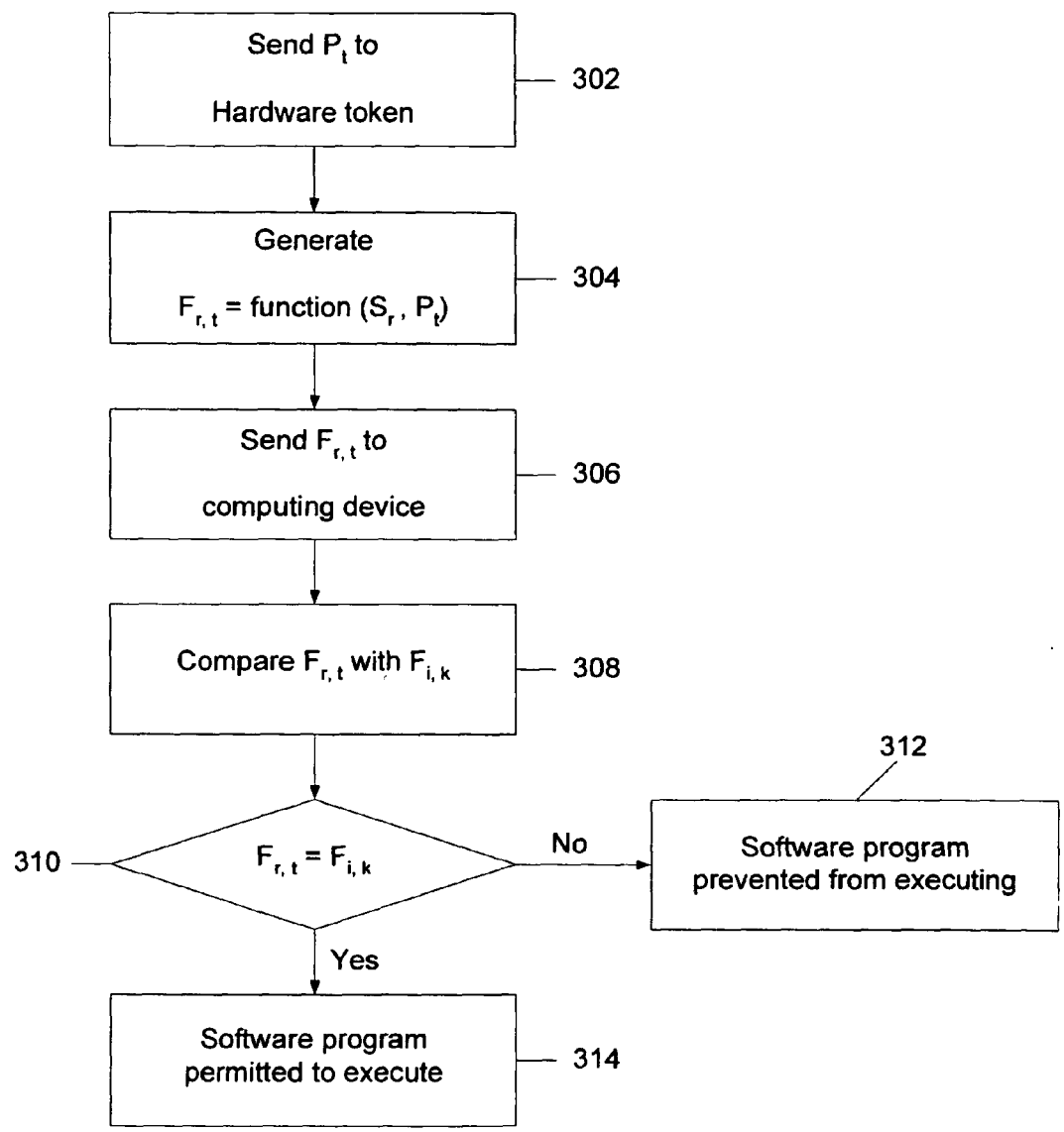
FIG. 3 illustrates an exemplary flow diagram for a method of verifying that the state P of the persistence data corresponds with the state S of the hardware token, according to the present invention.

After the system 100 generates the cryptographic value F as a cryptographic check with state P, the system may use the cryptographic value F and state P in a verification process to verify that the version of the software program is an authorized version, and not a version installed using a backup copy of the hard disk to circumvent the persistence data. FIG. 3 illustrates an exemplary flow diagram of a method for verifying whether the state $P_k$ of the persistence data has been updated without a similar update of state $S_i$ of the hardware token 104. This method assumes that state $P_k$ is the previous state of the persistence data, state $S_i$ is the previous state of the hardware token 104, and the previous cryptographic check is $F_{i,k}$. In 302, at current update number "t" of the state P of the persistence data, the software program retrieves state $P_t$ of the persistence data, and then transmits state $P_t$ to the hardware token 104 along with a verification signal requesting a calculation of the cryptographic value F with the current state S of the hardware token 104. In 304, assuming the state S of the hardware token 104 is at update number r, the hardware token 104 identifies its state $S_r$, and calculates $F_{r,t}$=function($S_r$, $P_t$). In 306, the hardware token 104 transmits the cryptographic value $F_{r,t}$ to the computing device 102. In 308, the software program receives the cryptographic value $F_{r,t}$ and retrieves the previously stored cryptographic value $F_{i,k}$ for comparison. In 310, the software program compares $F_{r,t}$ with $F_{i,k}$. If t=k and r=i, then $F_{r,t}=F_{i,k}$, and the state $P_k$ of the persistence data has not updated without a similar update of the state $S_i$ of the hardware token 104. Thus, in 314 the software program permits itself to execute. If t≠k or r≠i, then $F_{r,t} \ne F_{i,k}$, which indicates that a backup copy of the hard disk of the computing device 102 may have been restored. In 312 the software program prevents itself from executing. Loading a backup copy of the hard disk changes the update number k of the persistence data state P without a corresponding change of the update number i of the state S of the hardware token 104. Without corresponding updates of state $P_k$ and state $S_i$, the later generated function F does not receive the same inputs as the earlier F, and thus the later computed cryptographic value $F_{r,t}$ does not equal the stored cryptographic value $F_{i,k}$. A difference between the later computed cryptographic value $F_{r,t}$ and the stored cryptographic value $F_{i,k}$ is used by the software program to indicate that a backup copy of the hard disk may have been loaded onto the hard disk of the computing device 102, and to prevent a newly installed copy of the software program from executing. Alternatively, other relationships between the cryptographic values $F_{r,t}$ and $F_{i,k}$ may be used to determine whether the software program is allowed to execute as will be appreciated by those of skill in the art. For example, in one exemplary embodiment, only the hash result of $F_{i,k}$, which may be, but is not limited to, a hash function, may be stored together with $P_k$, which prevents a hacker from finding and 'emulating' the correct value to the software program. In this example, at verification, the software program may also hash the value $F_{r,t}$ received from the hardware token 102 and compare this hashed value with a previously stored hash value, $F_{i,k}$.

In another exemplary embodiment of the invention, the state $S_i$ of the hardware token 104 is associated with a counter $C_i$ on the hardware token 104. In this embodiment, $S_i=C_i$. The update number i of counter $C_i$ is originally set to i=0 and incremented at each change of state $S_i$. In an alternative embodiment, the update number i of counter $C_i$ may be set to i=maximum value and decremented at each change of state $S_i$. In a further alternative embodiment, the update number i=x, where 0<x<maximum value. The hardware token 104 may use a hash function $F_{i,k}$=function ($S_i$, $P_k$)=$H_{i,k}$=hash($C_i$, $P_k$) to hash states $C_i$ and $P_k$, and the software program may save the cryptographic value $H_{i,k}$ as a cryptographic check with state $P_k$. During verification of the software program at update "t" of state P for the persistence data, the software program transmits state $P_t$ to the hardware token 104 along with a verification signal requesting a calculation of the cryptographic value F with the current state S of the hardware token 104. Assuming the hardware token 104 is at state $C_r$, where update number r is 0<r<maximum value, the hardware token 104 determines $H_{r,t}$=hash($C_r$, $P_t$) and transmits the cryptographic value $H_{r,t}$ to the software program on the computing device 102. The software program compares the cryptographic value $H_{r,t}$ with the stored cryptographic value $H_{i,k}$. If $H_{r,t}=H_{i,k}$, then the software program executes. If $H_{r,t} \ne H_{i,k}$, then the software program prevents itself from executing. When $H_{r,t} \ne H_{i,k}$, this indicates that a backup copy of the hard disk may have been loaded onto the computing device 102, as described above.

In another exemplary embodiment of the present invention, the hardware token 104 has on-token key generation and cryptographic capabilities. The key generated by the hardware token 104 may be a block cipher key. The key differs from the above embodiment using states S and P in that it is used with an encryption function (such as, including, but not limited to, RC4, DES, 3DES, AES, IDEA, Blowfish, Twofish) where the data encrypted is the persistent state $P_k$. At the token update request the hardware token 104 uses its update counter value i and current state $S_i$ as inputs to a function to generate a key value $K_i$ representing the next state value $S_{i+1}$, where $K_i$=function($S_i$, i) and 'i' corresponds to the update number of the key and of State S. At each change of the hardware token state $S_i$, the hardware token 104 generates a key value $K_i$. The key value $K_i$ is securely stored on the hardware token 104 and is not revealed outside of the hardware token 104 to the software program on the computing device 102, or to any other device or software. In the key generation process of persistence data state P, after an update of the persistence data from update number k-1 to k, the software program calculates the hash value $X_k$=hash($P_k$), and communicates $X_k$ to the hardware token 104 along with an update key request signal requesting a calculation of a cryptographic value F after an update of state S for the key of the hardware token 104. The hardware token 104 updates state $S_{i-1}$, to state $S_i$, generates the next key value $K_i$, and calculates the cryptographic value $F_{i,k}$=function($K_i$, $X_k$). The hardware token 104 then communicates the cryptographic value $F_{i,k}$ to the computing device 102. After each update, the software program stores the cryptographic value $F_{i,k}$ on the hard disk of the computing device 102 along with the persistence data state $P_k$.

To validate the present state $P_t$ of the persistence data at update number t, where 0<t<maximum value, the software calculates $X_t$=hash($P_t$) and communicates $X_t$ to the hardware token 104 along with a verification request signal. The hardware token 104 calculates $F_{r,t}$=function($K_r$, $X_t$) using the current key $K_r$ at update number "r" of the key, where 0<r<maximum value, and communicates the cryptographic value $F_{r,t}$ to the software program on the computing device 102 for comparison. If the update number of state S of the hardware token 104 has not changed, i.e., $K_r=K_i$, $X_t=X_k$, and $F_{r,t}=F_{i,k}$, then the software program permits itself to execute. If the update number of state S of the hardware token 104 has changed and $K_r \ne K_i$, the calculated cryptographic value $F_{r,t} \ne F_{i,k}$, and the software program prevents itself from executing. Thus, comparing the calculated cryptographic value $F_{r,t}$ with the stored cryptographic value $F_{i,k}$ can reveal if the user has installed a backup copy of the hard disk based on the state P of the persistence data.

In exemplary embodiments of the present invention, the cryptographic function F may use hash functions such as the Hash Message Authentication Codes (HMAC) (see at least the Request for Comments (RFC) 2104 by the Internet Engineering Task Force (IETF)) (i.e., $F_{i,k}$=HMAC($S_i$, $P_k$)). The internal hash function of the HMAC can be any conventionally used hash function, such as Message Digest (MD)4, MD5, Secure Hash Algorithm (SHA)-1, SHA-256, or other known hash functions, as will be appreciated by those of skill in the art. The cryptographic function may also use a symmetric-key encryption or decryption function (i.e., F=Enc(S, P)). Algorithms that may be used for comparing states P of the persistence data with states S of the hardware token 104 include, but are not limited to, RC4, Data Encryption Standard (DES), 3DES, Advanced Encryption Standard (AES), IDEA, Blowfish, Twofish etc. Also, it is not necessary to use the whole hash value $H_{i,k}$=hash($S_i$, $P_k$) or $X_k$=hash($P_k$). Instead, only a portion of the hash values $H_k$ or $X_k$ may be used. Additionally, the present invention may only store a portion of the HMAC or cryptographic check values $F_{i,k}$ together with a portion of states $P_k$ of the persistence data. Other functions and whole or portions of the results of these functions or inputs to the functions may be used, as will be appreciated by those of skill in the art.

The above relationship between the hardware token 104 and the computing device 102 has described the respective devices as performing certain portions of the update and verification process. However, the algorithms and functions in the update and verification process may be processed either on the hardware token 104 or the computing device 102. For example, the hardware token 104 may calculate the hash value $X_k$=hash($P_k$), and communicate both $X_k$ and its current key value $K_i$ to the software program to calculate the cryptographic value $F_{i,k}$=function($K_i$, $X_k$). Likewise, wireless connections between the hardware token 104 and the computing device 102 may also be used. Other similar modifications may be made to the present invention, as will be appreciated to those of skill in the art.

The invention is described in detail with respect to exemplary embodiments that are non-limiting examples, and it will now be apparent from the foregoing to those skilled in the art that changes and modifications may be made without departing from the invention in its broader aspects, and the invention, therefore, as is intended to cover all such changes and modifications as fall within the true spirit of the invention.

What is claimed is:

1. A method for preventing unauthorized use of a software program on a computing device comprising:
   updating data indicative of a first state of a software program on a computing device as software first state data;
   determining the state of the software program based on persistence data;
   transmitting by the computing device an update signal to a hardware token coupled to the computing device;
   receiving the update signal, updating by the hardware token data stored on the hardware token indicative of a state of the hardware token as hardware token state data in response to the received update signal, the hardware token state data including data from a counter,
   wherein in normal operation the hardware token does not allow the hardware token state data stored thereon to be derived or revealed outside of the hardware token; performing a first cryptographic check by the hardware token using the software first state data and the hardware token state data;
   storing the first cryptographic check on one of the computing device and the hardware token;
   performing a second cryptographic check by the hardware token using the hardware token state data and data indicative of a current state of the software program;
   retrieving from the one of the computing device and the hardware token the cryptographic check most recently stored thereon, and
   comparing the second cryptographic check to the retrieved cryptographic check; and
   preventing the software program from running on the computing device if the retrieved cryptographic check does not match the second cryptographic check.

2. The method of claim 1, wherein comparing the retrieved cryptographic check to the second cryptographic check is done using one of the hardware token and the computing device.

3. The method of claim 1, wherein comparing the first retrieved cryptographic check to the second cryptographic check uses a hash function.

4. The method of claim 1, wherein comparing the retrieved cryptographic check to the second cryptograph check uses a cryptographic algorithm.

5. The method of claim 1, wherein the persistence data include an expiration date.

6. The method of claim 1, wherein the persistence data include data from a counter.

7. The method of claim 1, wherein the persistence data include data from a timer.

8. A method for preventing unauthorized use of a software program on a computing device comprising:
   performing a first cryptographic check based on data indicative of a first state of the software program as software first state data, and data indicative of a state of a hardware token as hardware token state data using one of the hardware token and the computing device, the hardware token state data including data from a counter;
   storing the first cryptographic check on one of the hardware token and the computing device; performing a second cryptographic check based on the hardware token state data and data indicative of a current state of the software program using one of the hardware token and the computing device;
   determining the state of the software program based on persistence data;
   retrieving a the most recently stored cryptographic check from the hardware token or the computing device on which the first cryptographic check was stored;
   comparing the retrieved cryptographic check to the second cryptographic check using one of the hardware token and the computing device; and
   preventing the software program from running on the computing device if the retrieved cryptographic check does not match the second cryptographic check.

9. The method of claim 8, wherein performing the first cryptographic check uses a hash function.

10. The method of claim 8, wherein performing the first cryptographic check uses a cryptographic algorithm.

11. The method of claim 8, wherein performing the first cryptographic check is based on a function stored on the hardware token.

12. The method of claim 8, wherein comparing the first cryptographic check to the second cryptographic check uses a hash function.

13. The method of claim 8, wherein the persistence data include an expiration date.

14. The method of claim 8, wherein the persistence data include data from a counter.

15. The method of claim 8, wherein the persistence data include data from a timer.

16. A system for preventing unauthorized use of a software program on a computing device, the system comprising:
   a hardware token coupleable to the computing device and which, when coupled to the computing device, is operable to:
   store data indicative of a state of the hardware token as hardware token state data, the hardware token state data including data from a counter, receive an update signal from the computing device, and update the stored hardware token state data responsive to the received update signal, perform a first cryptographic check using the stored hardware token state data and data received from the computing device indicative of a first state of the software program as software first state data, transmit the first cryptographic check to the computing device coupled to the hardware token; and receive a verification signal from the computing device, and perform a second cryptographic check using the stored hardware token state data and data received from the computing device indicative of a current state of the software program as software current state data; and transmit the second cryptographic check to the computing device coupled to the hardware token; and the computing device, which, when coupled to the hardware token is operable to:

determine the state of the software program based on persistence data;

execute a software program configured to:

have a state on which data indicative of the state of the software program is based, update the software program state data in response to a predetermined event and transmit the update signal to the hardware token, receive a result of a comparison of the first cryptographic check and a second cryptographic check, and cease execution if the result is that the first cryptographic check does not match the second cryptographic check;

receive and store the first cryptographic check; receive the second cryptographic check;

retrieve the stored first cryptographic check and perform a comparison of the first cryptographic check to the second cryptographic check; and transmit the result of the comparison to the software program.

17. A hardware token coupleable to a computing device having a software program thereon and which, when coupled to the computing device, is operable to:

a memory stores instructions executed by a processor;

store data indicative of a state of the hardware token as hardware token state data, the hardware token state data including data from a counter, receive an update signal from the computing device, and update the stored hardware token state data responsive to the received update signal;

perform a first cryptographic check using the stored hardware token state data and data received from the computing device indicative of a first state of the software program as software first state data, transmit the first cryptographic check to the computing device coupled to the hardware token; and receive a verification signal from the computing device, and perform a second cryptographic check using the stored hardware token state data and data received from the computing device indicative of a current state of the software program as software current state data;

determine the state of the software program based on persistence data; and transmit the second cryptographic check to the computing device.

18. A non-transitory computer-readable storage medium having computer instructions which cause a computing device to:

execute a software program configured to:

have a state on which data indicative of the state of the software program as software program state data is based, determine the state of the software program based on persistence data;

update the software program state data in response to a predetermined event, and transmit an update signal to a hardware token, receive a result of a comparison of a first cryptographic check and a second cryptographic check, and cease execution if the result is that the first cryptographic check does not match the second cryptographic check;

receive data indicative of a state of the hardware token as hardware token state data, the hardware token state data including data from a counter;

obtain data indicative of a current state of the software program;

receive the first cryptographic check;

compute a second cryptographic check based on the current software program state data and the hardware token state data;

perform a comparison of the first cryptographic check to the second cryptographic check; and transmit a result of the comparison to the software program.

* * * * *